UNITED STATES PATENT OFFICE.

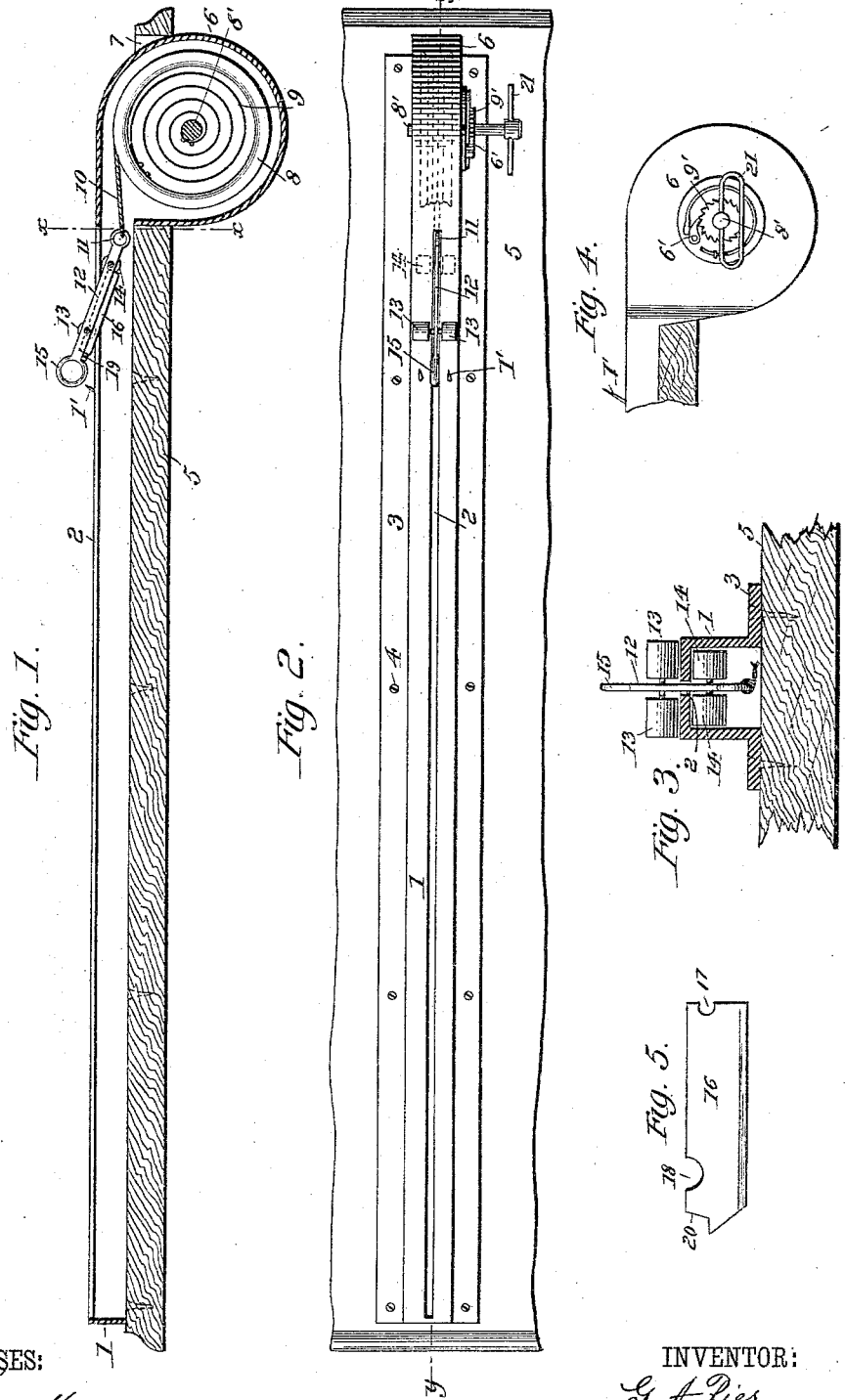

GEORGE A. RIES, OF POPLAR BLUFF, MISSOURI.

CLOTH-CUTTING MACHINE.

SPECIFICATION forming part of Letters Patent No. 381,644, dated April 24, 1888.

Application filed November 8, 1887. Serial No. 254,596. (No model.)

*To all whom it may concern:*

Be it known that I, GEORGE A. RIES, of Poplar Bluff, in the county of Butler and State of Missouri, have invented a new and Improved Cloth-Cutter, of which the following is a full, clear, and exact description.

This invention relates to a device for cutting cloth, and has for its object to provide such a device which will be simple in construction and effective in operation.

The invention will be set forth in the following description and claims.

Reference is to be had to the accompanying drawings, forming a part of this specification, in which similar figures of reference indicate corresponding parts in all the views.

Figure 1 is a vertical section on the line $y$ $y$ of Fig. 2. Fig. 2 is a plan view of the cloth-cutter with base broken away, and Fig. 3 is a cross-section on line $x$ $x$ of Fig. 1 with base broken. Fig. 4 is a side view of the casing for the knife-retaining mechanism with connection broken away, and Fig. 5 represents the knife detached.

In the construction of this device a casing, 1, preferably of metal and having a slot, 2, is secured by means of its flanges 3 and screws 4 to a counter, table, or other base or support, 5. The casing 1 has pins 1' to hold a piece of cloth to be cut, and is formed at one end with a circular receptacle, 6, located in an opening, 7, in support 5. Within the receptacle 6 is mounted a wheel or roller, 8, having a retracting-spring, 9, with shaft 8' of wheel 8 provided with a ratchet, 9', and a spring-actuated pawl, 6', on casing 6 engaging the ratchet. The shaft 8' is turned by means of a handle, 21. A cord, 10, wound upon the wheel 8, is secured to the ring 11 of a knife-holder, 12, extending diagonally through slot 2. The knife-holder 12 is provided with rubber rollers 13, located above slot 2, and similar rollers, 14, beneath said slot, and is formed with a ring, 15, at its outer end for the insertion of a finger. The knife 16 is secured in the holder 12 by means of a notch, 17, at one end, which engages the shaft or pin of rollers 14, and a notch, 18, which engages the axle-pin of the rollers 13, together with a set-screw, 19, which bears against the inclined shoulder 20 of the knife 16.

The operation of the device is as follows: A piece of cloth to be cut being placed over the piece or frame 1 and held by pins 1' and covering slot 2, the finger is inserted in ring 15 and the knife 16 drawn along, the rollers 13 pressing down the cloth firmly as it is cut. The rollers 13 with rollers 14 also serve as friction-rollers, whereby the knife may easily and quickly run backward and forward. When the knife 16 has reached the outer end of slot 2, the cord 10 will have been drawn out and the tension of spring 9 so increased that upon letting go of the knife it will fly back to its original position by means of the action of the spring 9 and cord 10. The tension of spring 9 may be regulated by turning the handle 21.

By means of this device cloth may be easily and quickly cut and the knife always be in convenient position for use.

I do not intend to limit myself to the precise construction of parts described, as they may be varied so as to accomplish the same result. The device is simple and inexpensive. The knife may be sharpened by removing the set-screw 19 and drawing it out of the holder 12.

Having thus fully described my invention, I claim as new and desire to secure by Letters Patent—

1. A cloth-cutter consisting of a longitudinally-slotted cloth-support, a knife having one end projecting through the slot of the support and provided with laterally-projecting stops above and below the said support, and a retracting-spring and cord connected to the end of the knife below the cloth-support, substantially as described.

2. A cloth-cutter consisting of a longitudinally-slotted casing and a sliding knife-frame having one end projecting through the said slot, a knife secured in said frame, a spring-actuated roller or drum, and a cord connected to the said drum and to the end of the knife-frame within the casing, substantially as described.

3. A cloth-cutter consisting of a longitudinally-slotted casing, a sliding knife-frame held in an inclined position in the said slot, a knife secured in said frame, a spring-actuated roller or drum, and a cord connected to the said drum and knife-frame, substantially as described.

4. The combination of the slotted casing 1, holding-pins 1', knife-holder 12, having notched knife 16, set-screws 19, and ring 15, rollers 13 14, connecting-cord 10, and spring-roller 8, with pawl 6', ratchet 9', and handle 21, substantially as described.

GEORGE A. RIES.

Witnesses:
ARMON WALKER,
JNO. W. COLLEY.